United States Patent
Suzuki et al.

(10) Patent No.: US 8,545,714 B2
(45) Date of Patent: Oct. 1, 2013

(54) HEXAGONAL FERRITE MAGNETIC PARTICLE AND METHOD OF MANUFACTURING THE SAME, AND MAGNETIC RECORDING MEDIUM

(75) Inventors: Hiroyuki Suzuki, Minami-ashigara (JP); Nobuo Yamazaki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 369 days.

(21) Appl. No.: 13/077,250

(22) Filed: Mar. 31, 2011

(65) Prior Publication Data

US 2011/0244272 A1    Oct. 6, 2011

(30) Foreign Application Priority Data

Mar. 31, 2010  (JP) .................................. 2010-083612
Oct. 18, 2010  (JP) .................................. 2010-233775

(51) Int. Cl.
  *H01F 1/11*    (2006.01)
(52) U.S. Cl.
  USPC .................................... 252/62.58; 252/62.63
(58) Field of Classification Search
  USPC ........................................... 252/62.58, 62.63
  See application file for complete search history.

(56) References Cited

U.S. PATENT DOCUMENTS 4,407,721 A  * 10/1983  Koike et al. ................ 252/62.59

FOREIGN PATENT DOCUMENTS

| JP | 58-019733   | A |   | 2/1983  |
|----|-------------|---|---|---------|
| JP | 04-72601    |   | * | 3/1992  |
| JP | 04-284604   |   | * | 10/1992 |
| JP | 04-337521   | A |   | 11/1992 |
| JP | 05-283219   | A |   | 10/1993 |
| JP | 09-213513   | A |   | 8/1997  |
| JP | 2002-329605 | A |   | 11/2002 |

* cited by examiner

*Primary Examiner* — Carol M Koslow
(74) *Attorney, Agent, or Firm* — Sughrue Mion, PLLC

(57) ABSTRACT

An aspect of the present invention relates to a method of manufacturing a hexagonal ferrite magnetic particle comprising melting an Al-containing starting material mixture to prepare a melt and quenching the melt to obtain an amorphous material; subjecting the amorphous material to heat treatment to cause a hexagonal ferrite magnetic particle to precipitate in a product obtained by the heat treatment; collecting a hexagonal ferrite magnetic particle by subjecting the product to treatment with an acid and washing, wherein the hexagonal ferrite magnetic particle collected has a particle size ranging from 15 to 30 nm, comprises 0.6 to 8.0 weight percent of Al, based on $Al_2O_3$ conversion, relative to a total weight of the particle, and Al adheres to a surface of the hexagonal ferrite magnetic particle.

2 Claims, 7 Drawing Sheets

HEXAGONAL FERRITE MAGNETIC PARTICLE AND METHOD OF MANUFACTURING THE SAME, AND MAGNETIC RECORDING MEDIUM

CROSS-REFERENCE TO RELATED APPLICATIONS

This application claims the benefit of priority under 35 USC 119 to Japanese Patent Application No 2010-083612 filed on Mar. 31, 2010, and Japanese Patent Application No. 2010-233775 filed on Oct. 18, 2010, which are expressly incorporated herein by reference in their entirety.

BACKGROUND OF THE INVENTION

1. Field of the Invention

The present invention relates to a method of manufacturing a hexagonal ferrite magnetic particle, and more particularly, to a method of manufacturing a hexagonal ferrite magnetic particle that is suitable for use in manufacturing a particulate magnetic recording medium by a glass crystallization method.

The present invention further relates to a hexagonal ferrite magnetic particle obtained by the above method, and a particulate magnetic recording medium comprising the above hexagonal ferrite magnetic particle.

2. Discussion of the Background

Recently, ferromagnetic metal particles have come to be primarily employed in the magnetic layers of magnetic recording media for high-density recording. Ferromagnetic metal particles are comprised of acicular particles of mainly iron, and are employed in magnetic recording media for various applications in which minute particle size and high coercive force are required for high-density recording.

With the increase in the quantity of information being recorded, magnetic recording media are required to achieve ever higher recording densities. However, in improving the ferromagnetic metal particle to achieve higher density recording, limits have begun to appear. By contrast, hexagonal ferrite magnetic particles have a coercive force that is high enough for use in permanently magnetic materials. Magnetic anisotropy, which is the basis of coercive force, derives from a crystalline structure. Thus, high coercive force can be maintained even when the particle size is reduced. Further, magnetic recording media employing hexagonal ferrite magnetic powder in the magnetic layers thereof can afford good high-density characteristics due to their vertical components. Thus, hexagonal ferrite magnetic particle is an optimal ferromagnetic material for achieving high density.

In recent years, coating the surface of hexagonal ferrite particles with Al (see Document 1 (Japanese Unexamined Patent Publication (KOKAI) Showa No. 58-19733), Document 2 (Japanese Unexamined Patent Publication (KOKAI) Heisei No. 5-283219) and Document 3 (Japanese Unexamined Patent Publication (KOKAI) Heisei No. 9-213513)) and incorporating a small quantity of Mg or Al into hexagonal ferrite magnetic particles (see Document 4 (Japanese Unexamined Patent Publication (KOKAI) Heisei No. 4-337521)) have been proposed to further improve hexagonal ferrite magnetic particles having the above-described good characteristics. The contents of Documents 1 to 4 above are expressly incorporated herein by reference in their entirety.

The techniques described in Documents 1 to 4 are all attempts to enhance dispersion and achieve a uniform particle size distribution so as to increase the suitability of hexagonal ferrite magnetic particles to magnetic recording applications.

However, research conducted by the present inventors has revealed that medium output decreases in magnetic recording media employing the hexagonal ferrite magnetic particles surface-coated with Al or the like that are described in Documents 1 to 3. This has been attributed to large amounts of Fe and Ba dissolving out of the particles due to non-uniformity of the coating of Al or the like, with these ion components then reacting with fatty acids or their derivatives (fatty acid esters and the like) to form fatty acid metal salts that contaminate the head. Research by the present inventors has also revealed that these particles cause considerable abrasion of dispersion media during the preparation of coating liquids for magnetic recording media. The abrasion of dispersion media is linked to increased cost due to reduced medium service life. There may be a risk of powder produced by medium abrasion contaminating the medium and compromising magnetic characteristics.

Additionally, the hexagonal ferrite magnetic particles described in Document 4 are of large diameter and cannot be employed as magnetic particles in the magnetic recording media in which higher densities are currently required.

SUMMARY OF THE INVENTION

An aspect of the present invention provides for a hexagonal ferrite magnetic particle that is suitable as a ferromagnetic material in magnetic recording media for use in high density recording.

Known methods of manufacturing hexagonal ferrite magnetic particles include the glass crystallization method, hydrothermal synthesis method, and coprecipitation method. The glass crystallization method is said to be a good method of manufacturing hexagonal ferrite for use in magnetic recording media in terms of obtaining magnetic powders that are suitable to micropowders and to single-particle dispersion, both of which are desirable in magnetic recording media, and in terms of achieving a narrow particle size distribution. Accordingly, the present inventors conducted extensive research into achieving the above-stated hexagonal ferrite magnetic particle using the glass crystallization method, resulting in the following discoveries.

Normally, in the glass crystallization method, an amorphous material is heated to cause hexagonal ferrite magnetic particles and crystallized glass components (such as $BaO \cdot B_2O_3$) to precipitate, and an acid treatment is conducted to remove the crystallized glass components and obtain hexagonal ferrite magnetic particles. However, repeated washing during the acid treatment may cause particles of hexagonal ferrite to form an aggregate. Accordingly, when the hexagonal ferrite magnetic particles that are obtained are coated with Al or the like as is described in Documents 1 to 3, a coating of Al or the like is formed on the aggregate. Further, when coating processing is conducted in an aqueous solution of a metal salt as described in Documents 1 to 3 and the hexagonal ferrite magnetic particles aggregate in the aqueous solution, a coating of Al or the like is formed on the aggregate. Such aggregates have tended to be particularly prominent in the hexagonal ferrite magnetic particles that have been developed as microparticles in recent years. Subsequently, when the particles thus obtained are subjected to dispersion processing in a magnetic layer coating liquid, pulverization of the particle aggregate is thought to produce microparticles with surfaces that are not coated with Al or the like. FIG. 2 shows a model of this process. Fe and Ba dissolving out of the uncoated surfaces of such microparticles may form salts with the fatty acids, or their derivatives, that are employed as lubricant components in the medium, producing fatty acid metal salts. These fatty acid metal salts are thought to reduce the output of media employing hexagonal ferrite magnetic particles having particle surface coatings as described in Documents 1 to 3. Further, the particles themselves become hard due to the coating of Al or the like on the aggregate, which is presumed to cause abrasion of the dispersion medium during dispersion processing.

In this regard, the present inventors conducted further extensive research with the novel idea that it might be possible to coat Al on the surface of the particles while they were not aggregated (a model of hexagonal ferrite magnetic particles in this state is shown in FIG. 1) if the coating were formed during crystallization processing. Hexagonal ferrite magnetic particles in which a coating was formed while in a non-aggregated state made it possible to control the precipitation of fatty acid metal salts caused by the leaching out of large quantities of Fe and Ba and by abrasion of the dispersion media as set forth above, and permitted the formation of a magnetic recording medium for high-density recording.

The present inventors conducted further extensive research based on this knowledge, and devised the present invention.

An aspect of the present invention relates to a method of manufacturing a hexagonal ferrite magnetic particle comprising:

melting an Al-containing starting material mixture to prepare a melt and quenching the melt to obtain an amorphous material;

subjecting the amorphous material to heat treatment to cause a hexagonal ferrite magnetic particle to precipitate in a product obtained by the heat treatment;

collecting a hexagonal ferrite magnetic particle by subjecting the product to treatment with an acid and washing, wherein the hexagonal ferrite magnetic particle collected has a particle size ranging from 15 to 30 nm, comprises 0.6 to 8.0 weight percent of Al, based on $Al_2O_3$ conversion, relative to a total weight of the particle, and Al adheres to a surface of the hexagonal ferrite magnetic particle.

The starting material mixture may comprise an Al compound as a glass-forming component.

A further aspect of the present invention relates to a hexagonal ferrite magnetic particle prepared by the above manufacturing method.

The hexagonal ferrite magnetic particle may have a coercive force ranging from 159 to 318 kA/m.

On the surface of the hexagonal ferrite magnetic particle, Al may be present as an oxide.

The hexagonal ferrite magnetic particle may be comprised of a primary particle of hexagonal ferrite to which surface Al adheres.

The hexagonal ferrite magnetic particle may have a specific surface area ranging from 50 to 100 $m^2/g$.

The hexagonal ferrite magnetic particle may be a barium ferrite magnetic particle.

The hexagonal ferrite magnetic particle may be employed as a magnetic material for a magnetic recording medium.

A still further aspect of the present invention relates to a magnetic recording medium comprising a magnetic layer containing a ferromagnetic material and a binder on a non-magnetic support, wherein the ferromagnetic material comprises the above hexagonal ferrite magnetic particle.

The present invention can reduce dispersion medium abrasion during the manufacturing of a magnetic recording medium, prolonging the service life of the medium. Reducing the quantity of Fe and Ba leaching out of the magnetic material makes it possible to provide a magnetic recording medium in which the generation of fatty acid metal salts is inhibited. Further, since the surface treatment step to form a coating layer and the subsequent washing step are obviated in the process of manufacturing the magnetic material, the manufacturing period can be shortened, costs can be cut, and a reduction in the environmental burden can be achieved due to reduced waste liquid from washing.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein.

Figure 6:
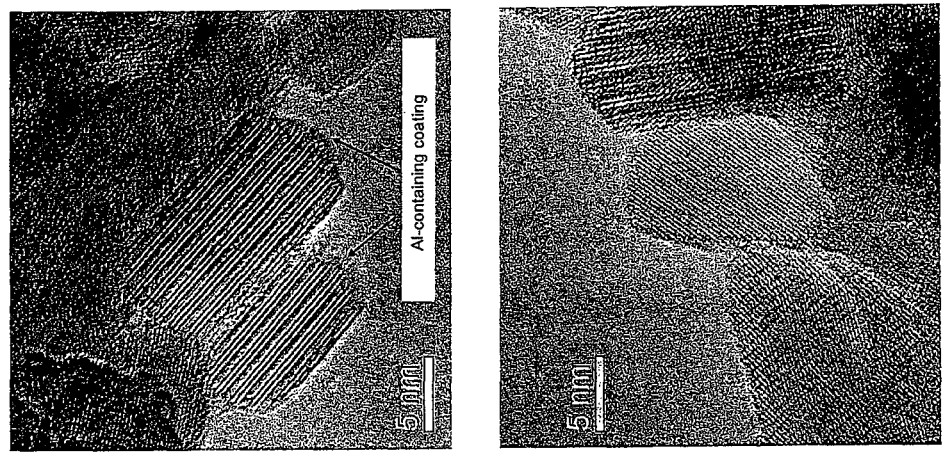

The upper photograph in FIG. 6 is a TEM photograph of particles in the magnetic powder obtained in Example 6, and the lower photograph in FIG. 6 shows a TEM photograph of particles in the hexagonal ferrite magnetic powder prepared in Comparative Example 7.

Figure 7:
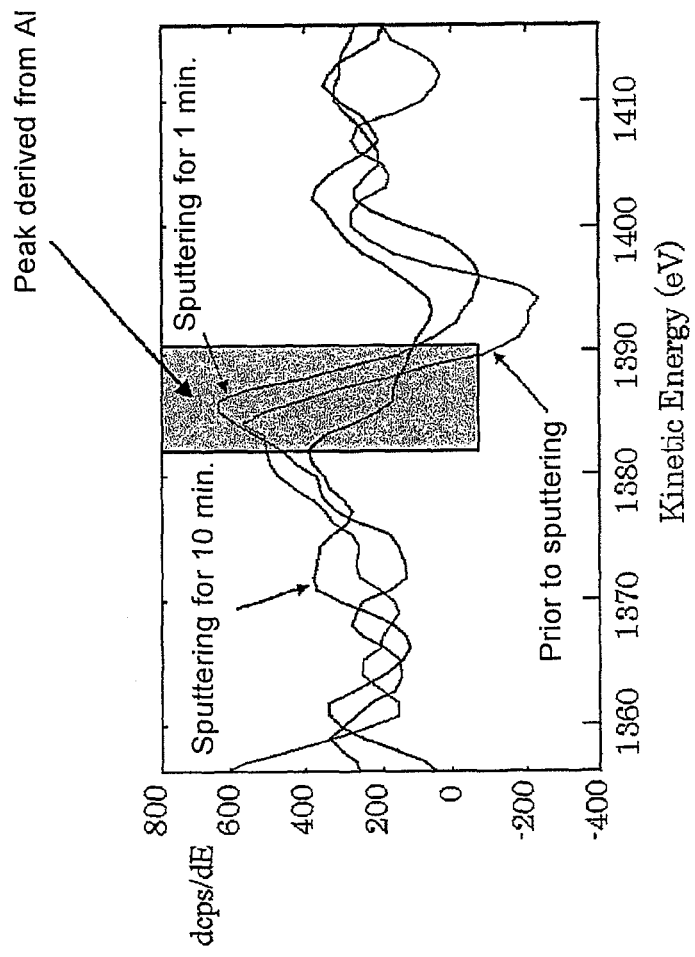

FIG. 7 shows results (an AES differential spectrum of Al) of analysis in the direction of depth of the quantity of Al by AES analysis while sputtering the particle surface for the magnetic powder prepared in Example 6.

Figure 8:
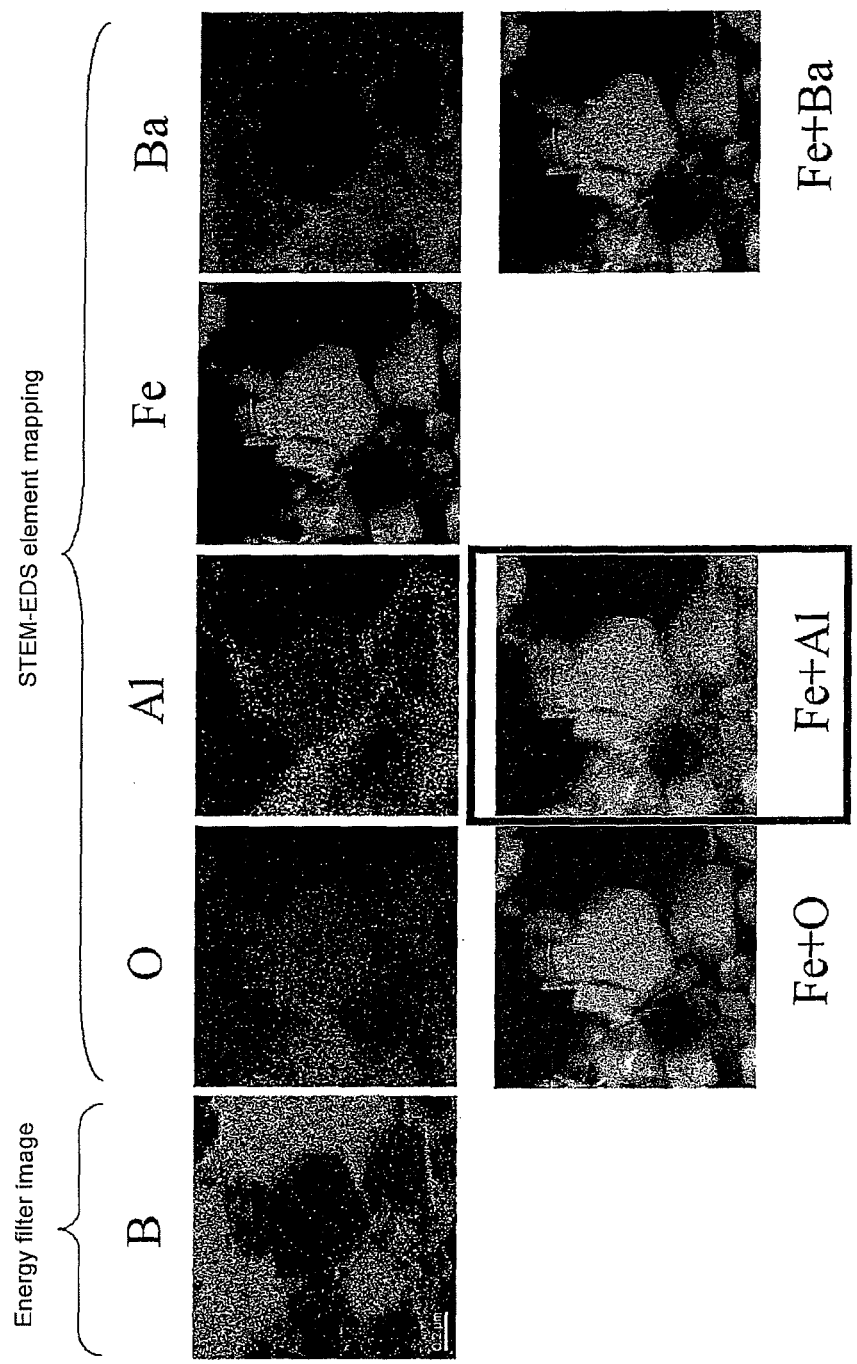

FIG. 8 shows results obtained by observing the heat treated product obtained in Example 6 by high resolution TEM to obtain an energy filter image and conduct STEM-EDS element mapping.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Method of Manufacturing Hexagonal Ferrite Magnetic Particle

The present invention relates to a method of manufacturing a hexagonal ferrite magnetic particle by the glass crystallization method. The glass crystallization method is generally comprised of the following steps:
(1) a step of melting a starting material mixture comprising a hexagonal ferrite-forming component (and an optional coercive force-adjusting component) and a glass-forming component to obtain a melt (melting step);
(2) a step of quenching the melt to obtain an amorphous material (amorphous rendering step);
(3) a step of heat treatment of the amorphous material to cause hexagonal ferrite particles to precipitate in a product obtained by the heat treatment (crystallization step); and
(4) a step of subjecting the heat treated product to treatment with an acid and washing to collect hexagonal ferrite magnetic particles (particle collecting step).

In the method of manufacturing a hexagonal ferrite magnetic particle of the present invention, an Al-containing starting material mixture is employed in step (1). Thus, it is possible to cause a material that forms an Al coating to precipitate out with the crystallized glass components and hexagonal ferrite magnetic particles in step (3). Subsequently, the acid treatment and washing in step (4) make it possible to collect hexagonal ferrite magnetic particles having particle diameters ranging from 15 to 30 nm, having Al adhered to the surface thereof, and containing 0.6 to 8.0 weight percent of Al, based on $Al_2O_3$ conversion, relative to the total weight of the particles.

By obtaining magnetic particles with surfaces to which an Al coating-forming material is adhered in steps (3) and (4) as set forth above instead of coating the surfaces of the hexagonal ferrite magnetic particles obtained through step (4) with Al or the like as conducted in conventional methods, it becomes possible to obtain hexagonal ferrite magnetic particles that abrade the dispersion media little and cause little drop in the output of the medium, as described in Examples further below.

The reason why the diameter of the particles obtained is set to 15 to 30 nm is that adequate magnetic characteristics are not obtained with particles that are less than 15 nm in diameter, and noise increases with particles exceeding 30 nm in diameter, both of which make it difficult to ensure the S/N ratio required for a magnetic recording medium employed in high-density recording. Further, causing particles exceeding 30 nm in diameter to precipitate requires more intense crystallization conditions (a higher crystallization temperature, a longer period of crystallization). Under intense crystallization conditions, Al is thought to tend to be incorporated into the interior of the particles. As a result, it is difficult to form a coating capable of reducing the drop in output and diminishing medium abrasion on the surface of the particles.

Additionally, at an Al content of less than 0.6 weight percent based on conversion to $Al_2O_3$, inadequate effects are achieved in terms of diminishing medium abrasion and reducing the drop in output. At greater than 8.0 weight percent, for unknown reasons, the medium surface hardens, the head is abraded, and output drops, which are unsuited to high-density recording applications. Accordingly, the Al content of the hexagonal ferrite magnetic particles obtained falls within a range of 0.6 to 8.0 weight percent based on conversion to $Al_2O_3$ relative to the total weight of the particles.

The method of manufacturing hexagonal ferrite magnetic powder of the present invention will be described in greater detail below.

(1) Melting Step

The starting material mixture employed in the glass crystallization method contains a glass-forming component and a hexagonal ferrite-forming component, and in the present invention, the starting material containing at least the above components are employed. The term "glass-forming component" refers to a component that is capable of exhibiting a glass transition phenomenon to form an amorphous material (vitrify). A $B_2O_3$ component is normally employed as a glass-forming component in the glass crystallization method. In the present invention, it is possible to employ a starting material mixture containing a $B_2O_3$ component as the glass-forming component. In the glass crystallization method, the various components contained in the starting material mixture are present in the form of oxides or various salts that can be converted to oxides in a step such as melting. In the present invention, the term "$B_2O_3$ component" includes $B_2O_3$ itself and various salts, such as $H_3BO_3$, that can be changed into $B_2O_3$ in the process. The same holds true for other components. Examples of glass-forming components other than $B_2O_3$ components are $SiO_2$ components, $P_2O_5$ components, and $GeO_2$ components.

Metal oxides such as $Fe_2O_3$, BaO, SrO, and PbO that serve as constituent components of hexagonal ferrite magnetic particle are examples of the hexagonal ferrite-forming component in the starting material mixture. For example, the use of a BaO component as the main component of the hexagonal ferrite-forming component makes it possible to obtain barium ferrite magnetic particle. The content of the hexagonal ferrite-forming component in the starting material mixture can be suitably set based on the desired electromagnetic characteristics.

Figure 1:
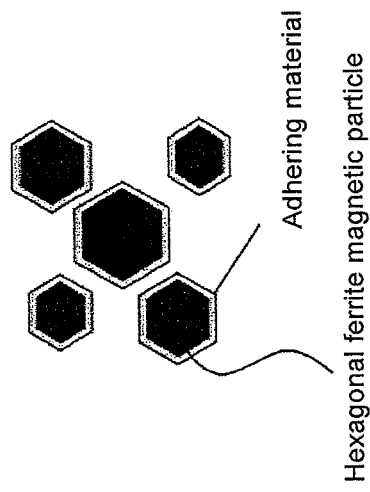
FIG. 1 is a model diagram of hexagonal ferrite magnetic particles relating to the present invention.
Figure 2:
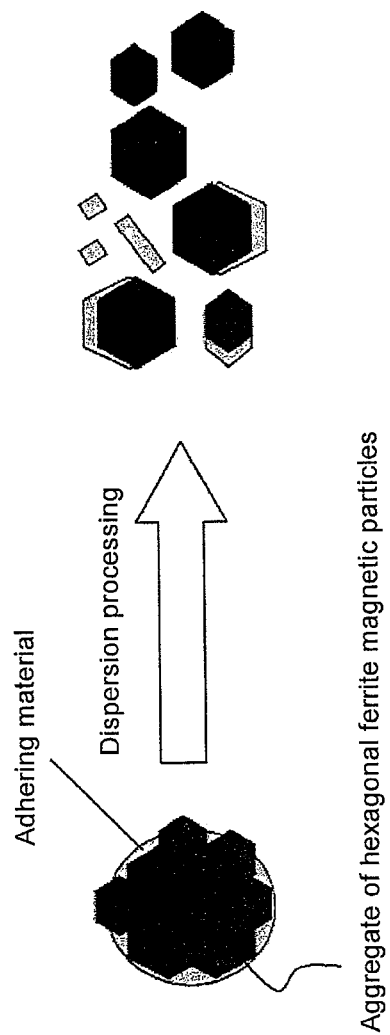
FIG. 2 is a model diagram showing the states before and after dispersion processing of hexagonal ferrite magnetic particles obtained by the conventional method.
Figure 3:
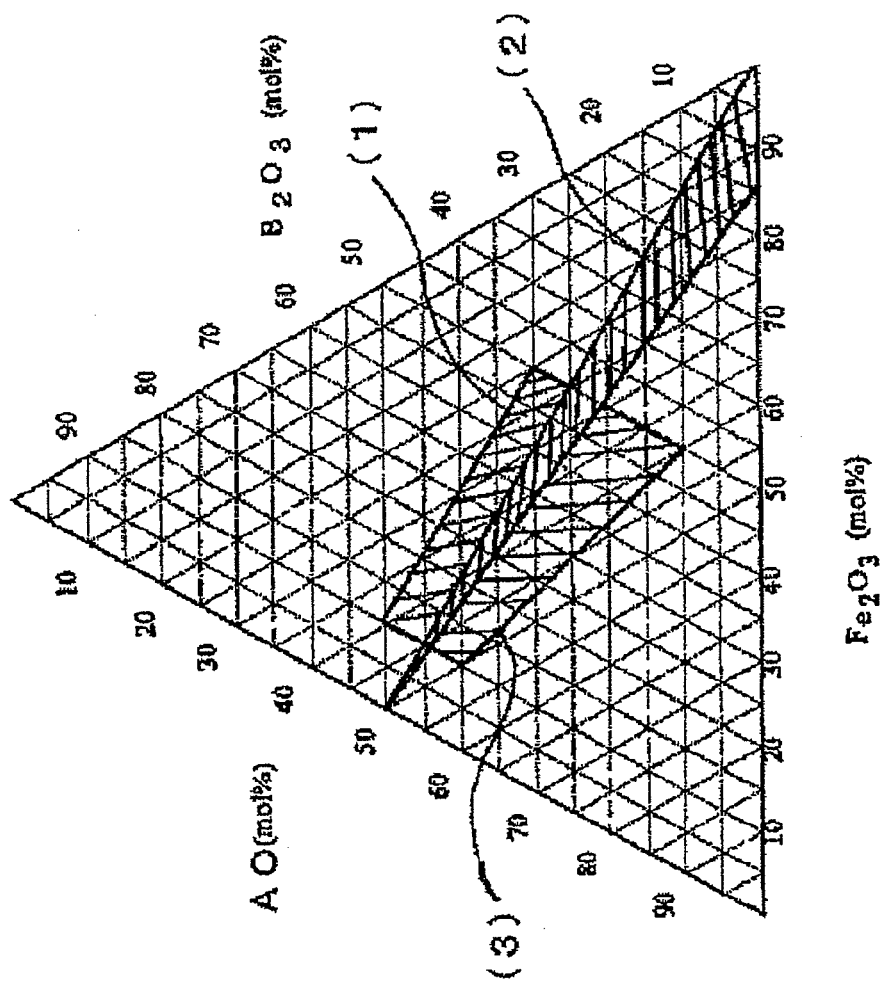
FIG. 3 is a descriptive drawing (triangular phase diagram) showing an example of the composition of the starting material mixture.

The composition of the starting material mixture is not specifically limited. For example, the starting materials within the composition regions of hatched portions (1) to (3) in the triangular phase diagram shown in FIG. 3, with an AO component (wherein A denotes one or more selected from among Ba, Sr, Ca, and Pb, for example), $B_2O_3$ component, and $Fe_2O_3$ component as vertices, are desirable to achieve a high coercive force Hc and saturation magnetization σs. The starting materials within the component region (hatched portion (3)) defined by the four points a, b, c, and d below are particularly desirable. As set forth above, a portion of the $B_2O_3$ component can be replaced with another glass-forming component such as a $SiO_2$ component or a $GeO_2$ component. As set forth further below, it is also possible to replace a portion of the $Fe_2O_3$ component to adjust the coercive force. In the present invention as described further below, a portion of the $B_2O_3$ component is desirably replaced with an Al compound and an Al compound is desirably employed as a glass-forming component.
 (a) $B_2O_3$=44, AO=46, $Fe_2O_3$=10 mole percent
 (b) $B_2O_3$=40, AO=50, $Fe_2O_3$=10 mole percent
 (c) $B_2O_3$=21, AO=29, $Fe_2O_3$=50 mole percent
 (d) $B_2O_3$=10, AO=40, $Fe_2O_3$=50 mole percent.

A portion of the Fe can be replaced with other metal elements to adjust the coercive force of the hexagonal ferrite magnetic powder obtained. Examples of these replacement elements are Co—Zn—Nb, Zn—Nb, Co, Zn, Nb, Co—Ti, Co—Ti—Sn, Co—Sn—Nb, Co—Zn—Sn—Nb, Co—Zn—Zr—Nb, and Co—Zn—Mn—Nb. To obtain such a hexagonal ferrite magnetic powder, it suffices to employ an additional hexagonal ferrite-forming component to adjust the coercive force. Examples of coercive force-adjusting components are divalent metal oxide components such as CoO and ZnO, and tetravalent metal oxide components such as $TiO_2$, $ZrO_2$, $SnO_2$ and $MnO_2$, and pentavalent metal oxide components such as $Nb_2O_5$. When employing such a coercive force-adjusting component, the content can be suitably determined to achieve the desired coercive force or the like.

In the present invention, a starting material mixture containing Al is employed to adhere Al to the particle surface in the process of the glass crystallization method. Al can be added in the form of an oxide or in the form of various salts (hydroxides and the like) that are convertible into oxides in steps such as the melting step. Most of the Al compound that is added to the starting material mixture is desirably present as an Al coating-forming material along with the glass components that crystallize without being incorporated into the particles that precipitate in the crystallization step to cause Al to adhere to the surface of the particles of hexagonal ferrite in the process of the glass crystallization method. For example, a portion of the $B_2O_3$ component in a starting material composition that has been determined so as to fall within the desirable composition range set forth above can be replaced with an Al compound to cause the Al compound to be present as a glass-forming component. The quantity of the Al compound that is added can be determined to cause 0.6 to 8.0 weight percent of Al based on conversion to $Al_2O_3$ to be present in the hexagonal ferrite magnetic particles that are finally obtained. The quantity of the Al compound that is added can be determined based on the results of preliminary testing. Specifically, based on oxide conversion, 1.0 to 10.0 molar percent relative to the total quantity of starting material compound is desirable. The proportion relative to the $B_2O_3$ component, given as a molar ratio, is desirably $B_2O_3$ component: Al compound=1:0.04 to 0.40.

The above starting material mixture can be obtained by weighing out and mixing the various components. Then, the starting material mixture is melted in a melting vat to obtain a melt. The melting temperature can be set based on the starting material composition, normally, to 1,000 to 1,500° C. The melting time can be suitably set for suitable melting of the starting material mixture.

(2) Amorphous Rendering Step

Next, the melt that is obtained is quenched to obtain a solid. The solid is an amorphous material in the form of glass-forming components that have been rendered amorphous (vitrified). The quenching can be carried out in the same manner as in the quenching step commonly employed to obtain an amorphous material in glass crystallization methods. For example, a known method can be conducted, such as a quenching rolling method in which the melt is poured onto a pair of water-cooling rollers being rotated at high speed.

(3) Crystallization Step

Following quenching, the amorphous material obtained is heat treated. This step causes hexagonal ferrite magnetic particles and crystallized glass components to precipitate. Here, when Al is present as an oxide such as $Al_2O_3$ or $BaAl_2O_4$ along with the crystallized glass components, the present inventors surmise that a portion remains on the surface of the particles without being removed by the subsequent acid treatment, adhering Al to the surface of the hexagonal ferrite magnetic particles.

From the perspective of inhibiting the Al from being incorporated into the interior of the particles in the crystallization step, the maximum temperature during crystallization (the crystallization temperature) is desirably equal to or lower than 760° C. Considering the hexagonal ferrite magnetic particle nucleus-generating temperature, the crystallization temperature is desirably equal to or higher than 580° C. and preferably equal to or higher than 600° C.

The particle size of the precipitating hexagonal ferrite magnetic particle can be controlled by means of the crystallization temperature and the period of heating during crystallization. In the pulverization processing and coating liquid dispersion processing described further below, the particle size of the hexagonal ferrite magnetic powder does not change. Accordingly, the crystallization temperature and the period of heating are desirably determined so as to obtain hexagonal ferrite magnetic particle with a final particle diameter of 15 to 30 nm in the present invention. The crystallization temperature is desirably set to within an optimal range within the above desirable range. The rate at which the temperature is raised to the crystallization temperature is suitably, for example, about 0.2 to 10° C./minute, and desirably, 0.5 to 5° C./minute. The period of maintenance within this temperature range is, for example, 0.5 to 24 hours, and desirably, 1 to 8 hours.

(4) Particle Collecting Step

Hexagonal ferrite magnetic particles and crystallized glass components precipitate in the heat treatment conducted during the crystallization step. Al oxides are presumed to be present along with the crystallized glass components, as set forth above. The presence of Al oxides along with glass components during heat treatment is actually confirmed in Examples described further below. Accordingly, when the heat treated product is subjected to an acid treatment, the crystallized glass components that enclose the particles dissolve out, permitting the collection of hexagonal ferrite magnetic particles. The reaction product containing Al oxide that remains without being removed by the acid treatment is presumed to form an adhered material on the surface of the particles. As a result, it is possible to obtain hexagonal ferrite magnetic particles to which surface Al is adhered.

Prior to the acid treatment, it is desirable to conduct pulverization processing to enhance the efficiency of the acid treatment. Coarse pulverization can be conducted by either a dry or wet method. However, from the perspective of achieving uniform pulverization, a wet method is desirable. The pulverization processing conditions can be set according to a known method, or reference can be made to Examples set forth further below.

The acid treatment to collect the particles can be conducted by a method that is generally conducted in the glass crystallization method, such as an acid treatment with heating. The acid treatment conditions can be determined by preliminary testing as needed to form the desired Al-containing coating.

The coarsely pulverized product is desirably maintained for about 0.5 to 10 hours in an aqueous solution of acetic acid, formic acid, butyric acid, or the like that has been heated to 60 to 90° C. (the acid concentration desirably being about 2 to 12 weight percent). This permits the dissolution and removal of the glass components that have crystallized. Subsequently, the product is washed, for example, with water and dried to obtain hexagonal ferrite magnetic particles. To control the quantity of the Al adhering to the particle surface, it is possible to subject the particles to an alkali treatment following the acid treatment to remove a portion of the adhering Al. The alkali treatment can be conducted by washing the particles with an aqueous solution of an alkali, such as sodium hydroxide or potassium hydroxide, following the acid treatment.

By means of the above-described steps, the present invention yields hexagonal ferrite magnetic particles with a particle diameter ranging from 15 to 30 nm, to the surfaces of which Al adheres, and the Al content of which, relative to the total weight of the particles, based on conversion to $Al_2O_3$, is 0.6 to 8.0 weight percent. In the present invention, the "particle diameter" of the hexagonal ferrite magnetic particles refers to the plate diameter as measured in a photograph taken by a transmission electron microscope (TEM). For multiple particles, the diameter of the hexagonal ferrite magnetic particles is the average value of the plate diameters of 500 particles randomly extracted from a TEM photograph. The "plate ratio" refers to the (plate diameter/plate thickness) as measured in a TEM photograph. For multiple particles, the plate ratio of the hexagonal ferrite magnetic particles is the arithmetic average value of the plate ratios of 500 particles randomly extracted in a TEM photograph.

The Al quantity in the particles can be obtained from the Al/Fe ratio by inductively coupled plasma (ICP) analysis. The fact that Al adheres to the particle surface can be confirmed by the fact that the Al/Fe ratio in the outer layer of the particle as determined by X-ray photoelectron spectroscopic (NTS) analysis is larger than the Al/Fe ratio obtained by the above ICP analysis, the fact that the presence of Al can be locally observed on the outer layer of the particles by auger electron spectroscopic (AES) analysis, and the fact that a coating is confirmed on the outer surface of the particles by sectional analysis by TEM. As set forth above, the Al that is present on the outer layer of the particles is presumed to be in the form of an oxide.

As set forth above, in the hexagonal ferrite magnetic particles with surfaces coated with Al or the like that are obtained by the conventional method, the formation of the coating on an aggregate of particles is thought to cause medium abrasion and the dissolving out of Fe. In this context, to improve the conventional method, it may be possible to form the coating after dispersion of the aggregate, but the investment in equipment for dispersion and the increased number of operating steps accompanying processing undesirably drive up the cost of manufacturing. By contrast, the present invention makes it possible to adhere Al to the surface of primary particles without employing such an additional dispersion step. When adhering processing is conducted as a separate step, surface processing to form the adhering material and subsequent washing are separately required. By contrast, these steps are obviated in the present invention, reducing the burden on the environment by reducing the amount of waste liquid from washing and cutting cost by shortening the manufacturing time.

Hexagonal Ferrite Magnetic Particle and Magnetic Recording Medium-Use Magnetic Powder The hexagonal ferrite magnetic particle of the present invention is obtained by the manufacturing method of the present invention. That is, the hexagonal ferrite magnetic particle of the present invention is a hexagonal ferrite magnetic particle having a particle diameter ranging from 15 to 30 nm, having a surface to which Al adheres, in which the Al content relative to the total weight of the particles is 0.6 to 8.0 weight percent based on conversion to $Al_2O_3$. Since an Al-containing film is formed in the process of the glass crystallization method, an Al-containing film can be present on the surface of primary particle of hexagonal ferrite, not on an aggregate of particles. The fact that Al has adhered to the surface of primary particles can be confirmed by sectional observation by TEM.

As stated above, the diameter of the hexagonal ferrite magnetic particles of the present invention ranges from 15 to 30 nm. From the perspective of enhancing the S/N, the particle diameter is desirably 15 to 25 nm, preferably ranging from 16 to 22 nm.

As set forth above, the Al content of the hexagonal ferrite magnetic particles of the present invention is 0.6 to 8.0 percent of the weight of the particles based on conversion to $Al_2O_3$. From the perspectives of reducing the amount of Fe dissolving out and dispersion medium abrasion, equal to or greater than 0.7 weight percent is desirable and equal to or greater than 1.0 weight percent is preferred. From the perspective of the saturation magnetization, equal to or lower than 7.5 weight percent is desirable.

From the perspective of achieving high density recording, the saturation magnetization as of the hexagonal ferrite magnetic particle of the present invention is desirably 30 to 70 $A \cdot m^2/kg$. For the same reasons, the coercive force is desirably 159 to 318 kA/m (approximately 2,000 to 4,000 Oe), preferably 175 to 286 kA/m (approximately 2,200 to 3,600 Oe).

From the perspective of reducing noise, the specific surface area by the BET method ($S_{BET}$) is desirably 50 to 100 $m^2/g$, preferably 60 to 100 $m^2/g$.

From the perspective of enhancing the coercive force of the magnetic particles, a reduction in particle size is known to be disadvantageous (coercive force decreases with particle diameter). Since hexagonal ferrite magnetic particles have high coercive force due to their crystalline structure, even with the reduction in coercive force due to the reduction in particle size, they can exhibit greater coercive force than ferromagnetic metal magnetic particles of equivalent particle size. This point is advantageous in high-density recording. However, higher coercive force in the microparticulate state is desirable in magnetic particles for use in high-density recording. Research conducted by the present inventors has revealed that the hexagonal ferrite magnetic particles of the present invention could exhibit higher coercive force for a given particle size than hexagonal ferrite magnetic particles obtained by coating Al or the like in an aqueous solution of a metal salt by the methods described in above-cited Documents 1 to 3 and uncoated hexagonal ferrite magnetic particles. This has been attributed to the adhering of a prescribed quantity of Al to the particle surface in the process of the glass crystallization method. Accordingly, the present invention can provide hexagonal ferrite magnetic particles in the form of microparticles of high coercive force that are desirable as magnetic particles for use in high-density recording. This is a further advantage of the present invention.

The present invention further relates to a magnetic powder for use in a magnetic recording medium that is comprised of the hexagonal ferrite magnetic particle of the present invention. The hexagonal ferrite magnetic particle of the present invention can inhibit the drop in medium output and diminish dispersion medium abrasion, as set forth above, and are thus suitable as a ferromagnetic material in magnetic recording media. Accordingly, the magnetic powder for use in a magnetic recording medium of the present invention permits the manufacturing with high productivity of magnetic recording media in which the production of fatty acid metal salts due to dissolving out of Fe and Ba is inhibited. As set forth above, since both particle size reduction and high coercive force can be achieved, the magnetic powder for use in a magnetic recording medium of the present invention can provide a magnetic recording medium for high-density recording with good magnetic characteristics.

Magnetic Recording Medium

The magnetic recording medium of the present invention comprises a magnetic layer containing a ferromagnetic material and a binder on a nonmagnetic support. The ferromagnetic material comprises the hexagonal ferrite magnetic particle of the present invention. As set forth above, the hexagonal ferrite magnetic particle of the present invention can reduce the quantities of Fe and Be dissolving out. Thus, the generation of fatty acid metal salts due to the dissolving out of Fe and Ba can be inhibited in the magnetic recording medium of the present invention that contains the above particle. Further, preparation of the magnetic layer coating liquid is normally conducted using a dispersion medium such as glass beads, zirconia beads, titania beads, or steel beads. Hexagonal ferrite magnetic particles that have been surface coated with Al or the like by the conventional method undergo a large amount of dispersion medium abrasion in this dispersion processing. By contrast, the hexagonal ferrite magnetic particle of the present invention can extend the service life of the dispersion medium, thereby enhancing productivity.

The magnetic recording medium of the present invention will be described in greater detail below.

Magnetic Layer

Details of the hexagonal ferrite magnetic powder employed in the magnetic layer, and the method of manufacturing the powder, are as set forth above. In addition to hexagonal ferrite magnetic powder, the magnetic layer comprises a binder. Examples of the binder comprised in the magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs [0029] to [0031] in Japanese Unexamined Patent Publication (KOKAI) No. 2010-24113, which is expressly incorporated herein by reference in its entirety, for details of the binder. A polyisocyanate curing agent may also be employed with the above resins.

Additives can be added as needed to the magnetic layer. Examples of these additives are abrasives, lubricants, dispersing agents, dispersion adjuvants, antifungal agents, antistatic agents, oxidation-inhibiting agents, solvents, and carbon black. The fatty acids and their derivatives that are widely employed as lubricants are effective components for improving running properties. However, in hexagonal ferrite magnetic particles coated with Al or the like by the conventional method, the generation of fatty acid metal salts causes a drop in output. By contrast, the present invention can inhibit the generation of fatty acid metal salts. Accordingly, the hexagonal ferrite magnetic particle of the present invention is suitable as a ferromagnetic material in magnetic recording media containing lubricant components in the form of fatty acids and/or their derivatives. Examples of fatty acids and their derivatives are given below. Examples of fatty acids are: capric acid, caprylic acid, lauric acid, myristic acid, palmitic acid, stearic acid, behenic acid, oleic acid, elaidic acid, linolic acid, linoleic acid, and isostearic acid. Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl. In the magnetic recording medium of the present invention, the content of fatty acids and their derivatives in the magnetic layer is, for example, 0.1 to 20 weight parts per 100 weight parts of ferromagnetic material, and in the nonmagnetic layer, 0.01 to 10 weight parts per 100 weight parts of nonmagnetic powder.

The additives set forth above may be employed in the form of a commercial product suitably selected based on desired properties.

Nonmagnetic Layer

Details of the nonmagnetic layer will be described below. The magnetic recording medium of the present invention may comprise a nonmagnetic layer comprising a nonmagnetic powder and a binder between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs [0036] to [0039] in Japanese Unexamined Patent Publication (KOKAI) No. 2010-24113 for details thereof.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Carbon black and organic powders can be added to the magnetic layer. Reference can be made to paragraphs [0040] to [0042] in Japanese Unexamined Patent Publication (KOKAI) No. 2010-24113 for details thereof.

Nonmagnetic Support

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in the present invention preferably ranges from 3 to 10 nm.

Layer Structure

As for the thickness structure of the magnetic recording medium of the present invention, the thickness of the nonmagnetic support preferably ranges from 3 to 80 μm. The thickness of the magnetic layer can be optimized based on the saturation magnetization of the magnetic head employed, the length of the head gap, and the recording signal band, and is normally 10 to 150 nm, preferably 20 to 120 nm, and more preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 μm, preferably 0.3 to 2.0 μm, and more preferably, 0.5 to 1.5 μm in thickness. The nonmagnetic layer of the magnetic recording medium of the present invention can exhibit its effect so long as it is substantially nonmagnetic. It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Backcoat Layer

A backcoat layer can be provided on the surface of the nonmagnetic support opposite to the surface on which the magnetic layer are provided, in the magnetic recording medium of the present invention. The backcoat layer desirably comprises carbon black and inorganic powder. The formula of the magnetic layer or nonmagnetic layer can be applied to the binder and various additives for the formation of the back layer. The back layer is preferably equal to or less than 0.9 μm, more preferably 0.1 to 0.7 μm, in thickness.

Manufacturing Method

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic material, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the magnetic layer, nonmagnetic layer and backcoat layer coating liquids. Dispersing media with a high specific gravity such as zirconia beads, titania beads, and steel beads are also suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic recording medium.

The magnetic recording medium of the present invention as set forth above can achieve a high output by incorporating the hexagonal ferrite magnetic particle of the present invention, and is thus suitable as a magnetic recording medium for high-density recording for which good electromagnetic characteristics are required.

EXAMPLES

The present invention will be described in detail below based on Examples. However, the present invention is not limited to Examples. The term "parts" given in Examples are weight parts unless specifically stated otherwise.

Example 1

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 23.0 molar percent of $B_2O_3$, 8.7 molar percent of $Al_2O_3$, 37.0 molar percent of BaO, and 31.3 molar percent of $Fe_2O_3$, charged to a mixer, and mixed. The mixture was charged to a two-liter platinum crucible, melted, and cooled with water-cooling rolls, yielding an amorphous material. A 600 g quantity of the amorphous material obtained was charged to an electric furnace, heated by 4° C./minute to 720° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation and the powder was dried, yielding hexagonal ferrite magnetic powder.

Example 2

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 26.3 molar percent of $B_2O_3$, 5.4 molar percent of $Al_2O_3$, 37.0 molar percent of BaO, and 31.3 molar percent of $Fe_2O_3$, charged to a mixer, and mixed. (A portion of the Fe was replaced with Co=0.5 at %, Zn=1.5 at %, and Nb=1 at %). The mixture was charged to a two-liter platinum crucible, melted, and cooled with water-cooling rolls, yielding an amorphous material. A 600 g quantity of the amorphous material obtained was charged to an electric furnace, heated by 4° C./minute to 700° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation and the powder was dried, yielding hexagonal ferrite magnetic powder.

Example 3

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 30.4 molar percent of $B_2O_3$, 1.3 molar percent of $Al_2O_3$, 37.0 molar percent of BaO, and 31.3 molar percent of $Fe_2O_3$, charged to a mixer, and mixed. (A portion of the Fe was replaced with Zn=1.5 at % and Nb=0.75 at %). The mixture was charged to a two-liter platinum crucible, melted, and cooled with water-cooling rolls, yielding an amorphous material. A 600 g quantity of the amorphous material obtained was charged to an electric furnace, heated by 4° C./minute to 660° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. The solid component separated from the solution that had been acid treated was stirred and washed for two hours in a 4N—NaOH solution that had been regulated to 95° C. Subsequently, washing (with water) was repeatedly conducted by decantation and the powder was dried, yielding hexagonal ferrite magnetic powder.

Example 4

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 19.9 molar percent of $B_2O_3$, 4.4 molar percent of $Al_2O_3$, 31.7 molar percent of BaO, and 44.0 molar percent of $Fe_2O_3$, charged to a mixer, and mixed. (A portion of the Fe was replaced with Nb=1 at %). The mixture was charged to a two-liter platinum crucible, melted, and cooled with water-cooling rolls, yielding an amorphous material. A 600 g quantity of the amorphous material obtained was charged to an electric furnace, heated by 4° C./minute to 700° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation and the powder was dried, yielding hexagonal ferrite magnetic powder.

Example 5

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 22.8 molar percent of $B_2O_3$, 1.5 molar percent of $Al_2O_3$, 31.7 molar percent of BaO, and 44.0 molar percent of $Fe_2O_3$, charged to a mixer, and mixed. (A portion of the Fe was replaced with Zn=1.5 at % and Nb=0.75 at %). The mixture was charged to a two-liter platinum crucible, melted, and cooled with water-cooling rolls, yielding an amorphous material. A 600 g quantity of the amorphous material obtained was charged to an electric furnace, heated by 4° C./minute to 660° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation and the powder was dried, yielding hexagonal ferrite magnetic powder.

Comparative Example 1

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 21.4 molar percent of $B_2O_3$, 10.3 molar percent of $Al_2O_3$, 37.0 molar percent of BaO, and 31.3 molar percent of $Fe_2O_3$, charged to a mixer, and mixed. The mixture was charged to a two-liter platinum crucible, melted, and cooled with water-cooling rolls, yielding an amorphous material. A 600 g quantity of the amorphous material obtained was charged to an electric furnace, heated by 4° C./minute to 730° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation and the powder was dried, yielding hexagonal ferrite magnetic powder.

Comparative Example 2

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 30.8 molar percent of $B_2O_3$, 0.9 molar percent of $Al_2O_3$, 37.0 molar percent of BaO, and 31.3 molar percent of $Fe_2O_3$, charged to a mixer, and mixed. (A portion of the Fe was replaced with Co=0.5 at %, Zn=1.5 at %, and Nb=1 at %.) The mixture was charged to a two-liter platinum crucible, melted, and cooled with water-cooling rolls, yielding an amorphous material. A 600 g quantity of the amorphous material obtained was charged to an electric furnace, heated by 4° C./minute to 640° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation and the powder was dried, yielding hexagonal ferrite magnetic powder.

Comparative Example 3

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 31.7 molar percent of $B_2O_3$, 37.0 molar percent of BaO, and 31.3 molar percent of $Fe_2O_3$, charged to a mixer, and mixed. (A portion of the Fe was replaced with Co=1 at %, Zn=3 at %, and Nb=2 at %.) The mixture was charged to a two-liter platinum crucible, melted, and cooled with water-cooling rolls, yielding an amorphous material. A 600 g quantity of the amorphous material obtained was charged to an electric furnace, heated by 4° C./minute to 640° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation, aluminum chloride hexahydrate was added to 2.5 weight percent based on $Al_2O_3$ conversion to the magnetic particles, and stirring was conducted for one hour at 85° C. Subsequently, caustic soda was added to adjust the pH to 9 and the mixture was stirred for one hour at 85° C. to form an Al-containing coating on the magnetic particles. Washing (with water) was repeatedly conducted by decantation and the powder was dried, yielding hexagonal ferrite magnetic powder.

Comparative Example 4

Prescribed quantities of $H_3BO_3$ for $B_2O_3$, $Al(OH)_3$ for $Al_2O_3$, $BaCO_3$ for BaO, and $Fe_2O_3$ were weighed out so as to yield, based on conversion to the oxide, 30.7 molar percent of $B_2O_3$, 1.0 molar percent of $Al_2O_3$, 37.0 molar percent of BaO, and 31.3 molar percent of $Fe_2O_3$, charged to a mixer, and mixed. (A portion of the Fe was replaced with Zn=1.5 at % and Nb=1 at %.) The mixture was charged to a two-liter platinum crucible, melted, and cooled with water-cooling rolls, yielding an amorphous material. A 600 g quantity of the amorphous material obtained was charged to an electric furnace, heated by 3° C./minute to 780° C., and maintained at that temperature for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, washing (with water) was repeatedly conducted by decantation and the powder was dried, yielding hexagonal ferrite magnetic powder.

The powders obtained in the above Examples and Comparative Examples were analyzed by X-ray diffraction to confirm that they were hexagonal ferrite (barium ferrite).

Next, magnetic tapes were prepared by the following method with the hexagonal ferrite magnetic powders obtained in the Examples and Comparative Examples.
    Magnetic Layer Coating Liquid
    Hexagonal barium ferrite powder: 100 parts
    (powder obtained in the above Examples and Comparative Examples)
    Polyurethane resin: 5 parts
    Polyester polyol/diphenylmethane diisocyanate-based, containing a branching side chain, $-SO_3Na=0.07$ meq/g
    Vinyl chloride copolymer (MR104 made by Zeon Corp.): 10 parts
    Oleic acid: 10 parts
    α-Alumina (particle size 0.15 μm): 5 parts
    Carbon black (average particle diameter 20 nm): 0.5 part
    Cyclohexanone: 110 parts
    Methyl ethyl ketone: 100 parts
    Toluene: 100 parts
    Butyl stearate: 2 parts
    Stearic acid: 1 part
    Nonmagnetic Layer Coating Liquid
    Nonmagnetic inorganic powder: 85 parts
    α-Iron oxide
        Surface treatment layer: $Al_2O_3$, $SiO_2$
        Average major axis length: 0.15 μm
        Average acicular ratio: 7
        Specific surface area by BET method: 52 $m^2/g$
        pH: 8
    Carbon black: 15 parts
    Vinyl chloride copolymer (MR110 made by Zeon Corp.): 10 parts
    Polyurethane resin: 10 parts
    Polyester polyol/diphenyhnethane diisocyanate-based, containing a branching side chain, $-SO_3Na=0.2$ meq/g
    Phenylphosphonic acid: 5 parts
    Cyclohexanone: 140 parts
    Methyl ethyl ketone: 170 parts
    Butyl stearate: 2 parts
    Stearic acid: 1 part
    Backcoat Layer Coating Liquid
    Microparticulate carbon black powder: 100 parts
    (BPr800 Made by Cabot Corp., Average Particle Size: 17 Nm)
    Coarse particulate carbon black powder: 10 parts
    (Thermal black made by Cancarb, average particle size: 270 nm)
    α-Alumina (hard inorganic powder): 2 parts
    Average particle size: 200 mm, Mohs' hardness: 9
    Nitrocellulose resin: 140 parts
    Polyurethane resin: 15 parts
    Polyester resin: 5 parts
    Dispersing agent
    Copper oleate: 5 parts
    Copper phthalocyanine: 5 parts
    Barium sulfate: 5 parts
    (BF-1, made by Sakai Chemical Industry Co., Ltd., average particle diameter: 50 nm, Mohs' hardness: 3)
    Methyl ethyl ketone: 1,200 parts
    Butyl acetate: 300 parts
    Toluene: 600 parts The various components of the above nonmagnetic layer coating liquid were kneaded in an open kneader and then dispersed in a sand mill. To the dispersion obtained were added four parts of polyisocyanate (Coronate L, made by Nippon Polyurethane Industry Co., Ltd.) followed by 40 parts of a mixed solvent of methyl ethyl ketone and cyclohexanone. The mixture was mixed, stirred, and passed through a filter with a pore diameter of 1 μm to prepare a nonmagnetic layer coating liquid.

For the magnetic layer coating liquid, the hexagonal ferrite powder and oleic acid were dry dispersed for 15 minutes. The dispersion was then kneaded in an open kneader with the above magnetic layer components and dispersed using a sand mill. To the dispersion obtained were added three parts of polyisocyanate (Coronate L, made by Nippon Polyurethane Industry Co., Ltd.) followed by 40 parts of a mixed solvent of methyl ethyl ketone and cyclohexanone. The mixture was mixed, stirred, and passed through a filter having a pore diameter of 1 μm to prepare a magnetic layer coating liquid.

The above components of the backcoat layer coating liquid were kneaded in a continuous kneader and then dispersed in a sand mill. To the dispersion obtained were added 40 parts of polyisocyanate (Coronate L, made by Nippon Polyurethane Industry Co., Ltd.) and 1,000 parts of methyl ethyl ketone. The mixture was stirred and passed through a filter having a pore diameter of 1 μm.

The nonmagnetic layer coating liquid and magnetic layer coating liquid obtained were simultaneously multilayer coated on a support (biaxially drawn polyethylene terephthalate) 5 μm in thickness so as to form a nonmagnetic layer with a film thickness of 1.0 μm upon drying and a magnetic layer with a film thickness of 0.10 μm upon drying with a total tape thickness of 6.6 μm upon drying, and the coating liquids were dried. Subsequently, a backcoat layer was coated in a quantity calculated to yield a thickness of 0.5 μm upon drying to the opposite surface from that on which the magnetic layer had been formed.

Subsequently, calendering was conducted at a temperature of 80° C. and a linear pressure of 350 kg/cm (343 kN/m) at a rate of 100 meters/minute with a seven-stage calender comprised of metal rolls, and the roll obtained was heat treated for 48 hours at 60° C. Next, the roll was slit to a width of ½ inch to prepare a magnetic tape.

Evaluation Methods

1. Al Content of the Particles

A 0.01 g quantity of each of the hexagonal ferrite magnetic powders obtained in the Examples and Comparative Examples was immersed in 10 mL of 4N—HCl and dissolved by heating for three hours at 80° C. on a hot plate. The solutions were diluted and the Fe and Al were quantified by ICP to determine the Al content based on conversion to $Al_2O_3$ relative to the total weight of the particles.

2. Level of Medium Abrasion

A 4.3 g quantity of the above magnetic layer coating liquid was mixed with 12.5 g of $ZrO_2$ beads 0.5 mm in diameter and a dispersion was prepared at a frequency of 640 rpm and a dispersion time of 360 minutes in a paint shaker made by Asada Iron Works Co., Ltd. The dispersion was coated on a 10 μm base of PET in a manner calculated to yield a magnetic layer thickness of 10 μm upon drying to prepare a sheet for use in measuring the level of medium abrasion. The quantity of Zr in the sheet was determined by fluorescence X-ray analysis using a Zr calibration curve that had been prepared in advance to determine the amount of medium abrasion.

3. Drop in Output

Using the following evaluation device on the magnetic tapes that had been prepared, a signal was recorded and reproduced at 200 kfci. The output on the first pass was adopted as a reference. Reproduction alone was conducted 1,000 times on a 400 m length, at which time the difference in the output was calculated and adopted as the drop in output.

Device Reel-to-reel plate tester

Writing head Write-gap: 0.22 μm; Bs: 1.5 T

Reproduction head: GMR head; shield spacing: 0.5 μm; track width: 1.5 μm

4. Head Abrasion

Figure 4:
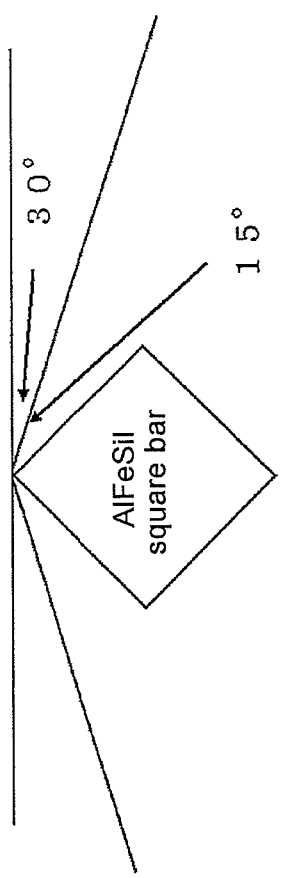
FIG. 4 is a descriptive drawing of the method of evaluating head abrasion in Examples.

A magnetic tape was rubbed against the dummy head material (AlFeSil-bar) indicated in the schematic sectional view of FIG. 4 and the shaving width was quantified to determine head abrasion. The rubbing method was as follows. A square bar of AlFeSil was lapped with a magnetic tape 400 m in length at an angle of 15 degrees, and the width of the abraded surface of the square bar following 50 passes when a tension of 100 g was applied was evaluated. Head abrasion exceeding 20 μm is inadequate in terms of practical use, so a determination of equal to or less than 20 μm can be considered good.

5. Particle Diameter of Magnetic Particles

A photograph of the particles was taken at 400.000-fold magnification by a transmission electron microscope (TEM), the arithmetic average plate diameter of 500 particles in the photograph was calculated, and this value was adopted as the particle diameter.

6. Magnetic Characteristics (Coercive Force)

The coercive force of the magnetic particles obtained was measured at an applied magnetic field of 1194 kA/m (15 kOe) at 23° C. with a vibrating sample magnetometer (made by Toei-Kogyo Co. Ltd.).

7. Specific Surface Area

The specific surface area of the magnetic powders obtained was measured by the BET method.

8. Determination of the State in which Al was Present

Figure 5:
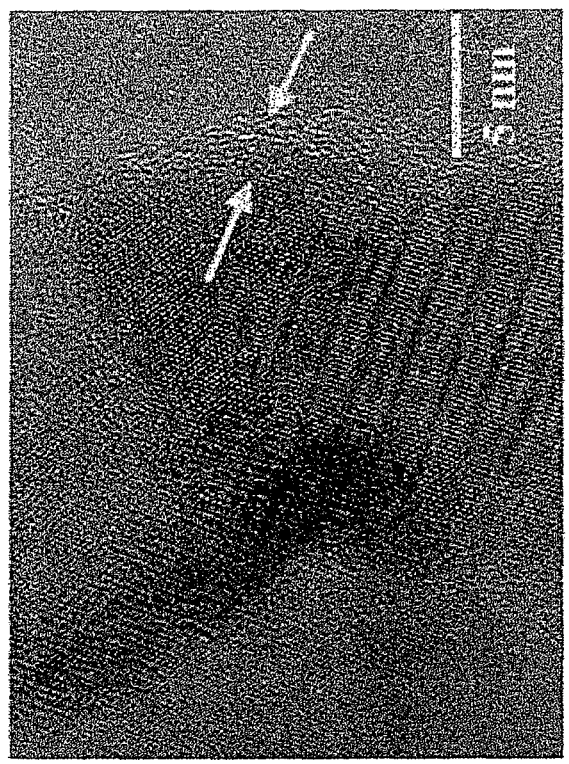
FIG. 5 is a sectional photograph by TEM of a particle of magnetic powder manufactured in Example 1.

The cross-sections of the particles of the magnetic powders prepared in the Examples and Comparative Examples were observed by high-resolution TEM to confirm the formation of coatings on the outer surfaces thereof. As a typical example, the TEM photograph of the particles in the magnetic powder obtained in Example 1 is shown in FIG. 5. The magnetic powders prepared in the Examples and Comparative Examples were then subjected to X-ray photoelectron spectroscopic (XPS) analysis to measure the Al/Fe ratio at a depth of about 0.5 nm from the surface of the particle. This gave a value of 1.5 to 2.0-fold the value of the measurement by ICP obtained in 1. above, confirming that Al was locally present on the outer layer.

Based on these results, Al coatings were confirmed to be present on the surface of the magnetic powders prepared in the Examples and Comparative Examples. The above observation by TEM confirmed that the coatings were formed on primary particles in the magnetic particles obtained in the Examples.

These evaluation results are given in Table 1.

TABLE 1

| | Composition of starting material mixture (mol %) | | | | Characteristics of magnetic powder | | | | | Evaluation results | | |
|---|---|---|---|---|---|---|---|---|---|---|---|---|
| | | | | | Al content based on $Al_2O_3$ conversion (weight %) | Coercive force Hc denoted by unit, kA/m | Coercive force Hc denoted by unit, Oe | Particle diameter (nm) | Specific surface area ($m^2$/g) | Level of medium abrasion (g/1 kg of magnetic powder) | Drop in output (dB) | Head abrasion |
| | $B_2O_3$ | $Al_2O_3$ | BaO | $Fe_2O_3$ | | | | | | | | |
| Ex. 1 | 23 | 8.7 | 37 | 31.3 | 7.8 | 258 | 3240 | 22 | 82 | 0.04 | −0.5 | 20 μm |
| Ex. 2 | 26.3 | 5.4 | 37 | 31.3 | 4.9 | 222 | 2790 | 22 | 70 | 0.03 | 0 | 15 μm |

TABLE 1-continued

| | Composition of starting material mixture (mol %) | | | | Characteristics of magnetic powder | | | | | Evaluation results | | |
|---|---|---|---|---|---|---|---|---|---|---|---|---|
| | | | | | Al content based on Al$_2$O$_3$ conversion | Coercive force Hc denoted by | Coercive force Hc denoted by | Particle diameter | Specific surface area | Level of medium abrasion (g/1 kg of magnetic | Drop in output | Head |
| | B$_2$O$_3$ | Al$_2$O$_3$ | BaO | Fe$_2$O$_3$ | (weight %) | unit, kA/m | unit, Oe | (nm) | (m$^2$/g) | powder) | (dB) | abrasion |
| Ex. 3 | 30.4 | 1.3 | 37 | 31.3 | 0.6 | 209 | 2620 | 21 | 74 | 0.10 | −1 | 10 μm |
| Ex. 4 | 19.9 | 4.4 | 31.7 | 44 | 3.0 | 231 | 2900 | 21 | 80 | 0.05 | −0.5 | 14 μm |
| Ex. 5 | 22.8 | 1.5 | 31.7 | 44 | 1.1 | 197 | 2470 | 19 | 89 | 0.07 | −0.6 | 13 μm |
| Comp. Ex. 1 | 21.4 | 10.3 | 37 | 31.3 | 9.5 | 240 | 3010 | 20 | 85 | 0.03 | −2 | 40 μm |
| Comp. Ex. 2 | 30.8 | 0.9 | 37 | 31.3 | 0.3 | 205 | 2580 | 20 | 85 | 0.12 | −3 | 5 μm |
| Comp. Ex. 3 | 31.7 | 0 | 37 | 31.3 | 2.4 | 191 | 2400 | 21 | 70 | 0.38 | −6 | 6 μm |
| Comp. Ex. 4 | 30.7 | 1.0 | 37 | 31.3 | 0.6 | 299 | 3750 | 32 | 50 | 0.24 | −5 | 5 μm |

Evaluation Results

As shown in Table 1, in Examples 1 to 5, there was little medium abrasion during dispersion and the drop in output and head abrasion both decreased.

By contrast, head abrasion was marked in Comparative Example 1. This was due to a hard tape surface caused by an excess quantity of Al in the hexagonal ferrite magnetic particles.

Additionally, there was little quantity of Al in the hexagonal ferrite magnetic particles of Comparative Example 2, resulting in inadequate effects of inhibiting the drop in output and medium abrasion during dispersion.

Comparative Example 3 was an example of the conventional method (coating Al on the hexagonal ferrite magnetic particles after the acid treatment and washing). There was a large amount of medium abrasion during dispersion and the output dropped in pronounced fashion. As set forth above, this was attributed to the Al being coated on an aggregate.

Comparative Example 4 was an example in which the diameter of the hexagonal ferrite magnetic particles exceeded 30 nm. Although the quantity of Al was 0.6 to 8 weight percent (based on conversion to Al$_2$O$_3$), it was impossible to inhibit medium abrasion and a drop in output. These were thought to have occurred due to the large particle diameter and the incorporation of a large quantity of Al into the interior of the particles resulting from the long duration of the crystallization treatment.

Based on these results, it was revealed that the present invention was able to inhibit medium abrasion during dispersion, a drop in output, and head abrasion.

Examples 6 and 7

Comparative Examples 5 to 8

Prescribed quantities of H$_3$BO$_3$ for B$_2$O$_3$, Al(OH)$_3$ for Al$_2$O$_3$, BaCO$_3$ for BaO, and Fe$_2$O$_3$ were weighed out so as to yield, based on conversion to the oxide, the quantities of B$_2$O$_3$, Al$_2$O$_3$, BaO, and Fe$_2$O$_3$ indicated in Table 2, charged to a mixer, and mixed. (A portion of the Fe was replaced with Nb=1 at %.) The mixture was charged to a two-liter platinum crucible, melted, and cooled with water-cooling rolls, yielding an amorphous material. A 600 g quantity of the amorphous material obtained was charged to an electric furnace. In Example 6 and Comparative Examples 5 and 7, the amorphous material was heated to 700° C., and in Example 7 and Comparative Examples 6 and 8, the amorphous material was heated to 680° C., at a rate of 4° C./m, with the final temperature being maintained for five hours to cause hexagonal ferrite to crystallize (precipitate). Next, 600 g of the heat treated product after the crystallization was coarsely pulverized in a mortar and charged to a three-liter pot mill. Pulverization was conducted for four hours in a ball mill with 5 kg of Zr balls 5 mm in diameter and 1.2 kg of pure water. Subsequently, the pulverized liquid was separated from the balls and charged to a five-liter stainless-steel beaker. The pulverized liquid was mixed with a 30 weight percent solution of acetic acid in a ratio (by weight) of 3:1 and acid treated by stirring for two hours while regulating the temperature at 85° C. Subsequently, in Examples 6 and 7 and Comparative Examples 7 and 8, washing (with water) was repeatedly conducted by decantation and the powder was dried, yielding hexagonal ferrite magnetic powder. In Comparative Examples 5 and 6, washing (with water) was repeatedly conducted by decantation after which aluminum chloride hexahydrate was added to 2.5 weight percent based on conversion to Al$_2$O$_3$ to the magnetic particles and stirring was conducted for 1 hour at 85° C. Subsequently, caustic soda was added to adjust the pH to 9 and stirring was conducted for 1 hour at 85° C. to form an Al-containing film on the magnetic particles. Washing (with water) was repeatedly conducted by decantation and the particles were dried, yielding hexagonal ferrite magnetic powder.

Evaluation Methods and Evaluation Results

The hexagonal ferrite magnetic powders obtained in Examples 6 and 7 and in Comparative Examples 5 to 8 were evaluated by the following methods.

1. Al Content of the Particles

A 0.01 g quantity of each of the hexagonal ferrite magnetic powders obtained in Examples 6 and 7 and Comparative Examples 5 to 8 was immersed in 10 mT, of 4N—HCl and dissolved by heating for three hours at 80° C. on a hot plate. The solutions were diluted and the Fe and Al were quantified by ICP to determine the Al content based on conversion to Al$_2$O$_3$ relative to the total weight of the particles.

2. Diameter and Plate Ratio of Magnetic Particles

A photograph of the particles was taken at 400,000-fold magnification by a transmission electron microscope (TEM), the arithmetic average of the plate diameters of 500 particles from the photograph was calculated, and this value was adopted as the particle diameter. The value obtained by calculating the arithmetic average of the (plate diameter/plate thickness) of the same 500 particles was adopted as the plate ratio.

3. Magnetic Characteristics (Coercive Force)

The coercive force of the magnetic particles obtained was measured at an applied magnetic field of 1194 kA/m (15 kOe) at 23° C. with a vibrating sample magnetometer (made by Toei-Kogyo Co. Ltd.).

4. Specific Surface Area

The specific surface area of the magnetic powders obtained was measured by the BET method.

When $Al_2O_3$ was incorporated into the ferrite composition as a coercive force-adjusting component in the glass crystallization method, the coercive force decreased due to the addition of this component. However, when added as a glass-forming component and present on the surface of the particles as an Al-containing adhering material, there was no drop in coercive force. In the starting material mixture of Example 6, a portion of the glass-forming component ($B_2O_3$ component) in Comparative Example 7 was replaced with $Al_2O_3$ component. No decrease in coercive force was observed relative to Comparative Example 7. This indicated that the $Al_2O_3$ component functioned as a glass-forming component in Example 6. The magnetic powder prepared in Example 6 had particles of about the same size (plate diameter, plate ratio, specific surface area) as the magnetic powder prepared in Comparative Example 7, but exhibited a substantial increase in coercive force relative to Comparative Example 7. This same fact was confirmed by a comparison of Example 7 and Comparative Example 8. These results indicate that in Examples 6 and 7, in the process of the glass crystallization method, the adhering of a prescribed quantity of Al to the surface of the particles yielded hexagonal ferrite magnetic particles that were suitable as particles for use in high-density recording in the form of microparticles with high coercive force.

5. Confirmation of the State in which Al was Present (1)

The cross-sections of the particles of the magnetic powders prepared in Examples 6 and 7 were observed by high-resolution TEM to confirm the formation of coatings on the outer surfaces thereof. As a typical example, a TEM photograph of the particles in the magnetic powder obtained in Example 6 is shown in the upper portion of FIG. 6. A TEM photograph of the particles in the hexagonal ferrite magnetic powder prepared in Comparative Example 7 is shown in the lower portion of FIG. 6. A comparison of the upper and lower portions of FIG. 6 reveals the presence of a coating on the outer layer portion of the particles in the upper portion.

Separately, the magnetic powders prepared in Examples 6 and 7 were subjected to X-ray photoelectron spectroscopic (XPS) analysis to measure the Al/Fe ratio at a depth of about 0.5 nm from the surface of the particle. This gave a value of 1.5 to 2.0-fold the value of the measurement by ICP obtained in 1. above, confirming that Al was locally present on the outer layer.

Further, the quantity of Al in the magnetic powder prepared in Example 6 was analyzed in the direction of thickness by auger electron spectroscopic (AES) analysis while sputtering the surface of the particles. At a sputtering time of one minute, it was possible to analyze Al at a position 0.7 nm from the surface of the particle. At a sputtering time of 10 minutes, it was possible to analyze Al at a position 7 nm from the surface of the particle. The results of the AES analysis (an AES differential spectrum of Al) are given in FIG. 7.

The strength of the peak derived from Al at a sputtering time of 10 minutes in AES analysis was lower than the strength of the peak derived from Al in the outermost surface of the particle prior to sputtering and the strength of the peak derived from Al at a sputtering time of one minute. Thus, Al was determined to be locally present on the outer layer portion of the particles.

Based on these results, an adhering material of Al was confirmed to be present on the surface of the magnetic powders prepared in Examples 6 and 7. The above observation by TEM confirmed that the coatings were formed on primary particles in the magnetic particles obtained in Examples 5 and 6.

6. Confirmation of the State in which Al was Present (2)

The heat treated product obtained in Example 6 was observed by high resolution TEM, an energy filter image was obtained, and STEM-EDS element mapping was conducted. The results are given in FIG. 8. In the upper portion of FIG. 8, from left to right, are the energy filter image of B, the mapping image of O, the mapping image of Al, the mapping image of Fe, and the mapping image of Ba.

In the mapping image of Fe, the portion in which the presence of Fe was confirmed (the light portion (appearing white)) is the portion in which precipitated hexagonal ferrite was present.

From the results of the energy filter image of B, the mapping image of Ba, and superposition of the mapping image of Fe on the mapping image of Ba (far right in lower portion of FIG. 8), it was confirmed that Ba and B were present (light portions) around the portion in which the hexagonal ferrite was present. This indicated the presence of crystallized glass components ($BaO \cdot B_2O_3$).

Superposition of the mapping image of Al on the mapping image of Fe (middle of lower portion of FIG. 8), the portions in which Al was locally observed (light portions) coincided with the portions in which Fe was locally observed. Based on these results, Al was determined to be locally present on the hexagonal ferrite.

The presence of O throughout was determined in the O mapping image, but portions in which large amounts of O were locally present were also observed. Accordingly, when superimposed on the mapping image of Fe (far left in lower portion of FIG. 8), the presence of a large amount of O in portions in which Fe was locally present was confirmed. Since portions in which Al was locally present and portions in which O was locally present were both on hexagonal ferrite, it was clear that this was a compound of Al and O, that is, the Al was present in the form of an oxide on the hexagonal ferrite. The magnetic powder prepared in Example 6 was obtained by removing the glass-forming components from this heat treated product. Thus, the adhering material of Al present on the outer layer was found to be an Al oxide. In the various Examples described above, magnetic powders were also prepared by this same method. Thus, Al was present in the state of an oxide on the outer surface of the particles in the magnetic powders obtained.

TABLE 2

| | Composition of starting material mixture (mol %) | | | | Characteristics of magnetic powder | | | | |
|---|---|---|---|---|---|---|---|---|---|
| | | | | | Al content based on $Al_2O_3$ conversion (weight %) | Coercive force Hc denoted by unit, kA/m | Coercive force Hc denoted by unit, Oe | Particle diameter (nm) | Plate ratio | Specific surface area ($m^2/g$) |
| | $B_2O_3$ | $Al_2O_3$ | BaO | $Fe_2O_3$ | | | | | | |
| Ex. 6 | 20.3 | 2.7 | 35.7 | 41.3 | 3.0 | 295 | 3702 | 22 | 3.2 | 79 |
| Ex. 7 | 20.3 | 2.7 | 35.7 | 41.3 | 3.3 | 272 | 3417 | 21 | 3.2 | 83 |
| Comp. Ex. 5 | 23 | 0 | 35.7 | 41.3 | 2.4 | 265 | 3334 | 22 | 3.1 | 69 |

TABLE 2-continued

| | Composition of starting material mixture (mol %) | | | | Al content based on $Al_2O_3$ conversion (weight %) | Characteristics of magnetic powder | | | | |
|---|---|---|---|---|---|---|---|---|---|---|
| | | | | | | Coercive force Hc | | Particle diameter (nm) | Plate ratio | Specific surface area ($m^2/g$) |
| | $B_2O_3$ | $Al_2O_3$ | BaO | $Fe_2O_3$ | | denoted by unit, kA/m | denoted by unit, Oe | | | |
| Comp. Ex. 6 | 23 | 0 | 35.7 | 41.3 | 2.4 | 231 | 2904 | 21 | 3.2 | 73 |
| Comp. Ex. 7 | 23 | 0 | 35.7 | 41.3 | 0 | 247 | 3106 | 22 | 3.1 | 72 |
| Comp. Ex. 8 | 23 | 0 | 35.7 | 41.3 | 0 | 213 | 2673 | 21 | 3.2 | 76 |

The present invention can provide with high productivity a magnetic recording medium for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing a hexagonal ferrite magnetic particle comprising:
    melting an Al-containing starting material mixture to prepare a melt and quenching the melt to obtain an amorphous material;
    subjecting the amorphous material to heat treatment to cause a hexagonal ferrite magnetic particle to precipitate in a product obtained by the heat treatment;
    collecting a hexagonal ferrite magnetic particle by subjecting the product to treatment with an acid and washing, wherein the hexagonal ferrite magnetic particle collected has a particle size ranging from 15 to 30 nm, comprises 0.6 to 8.0 weight percent of Al, based on $Al_2O_3$ conversion, relative to a total weight of the particle, and Al adheres to a surface of the hexagonal ferrite magnetic particle.

2. The method of manufacturing according to claim 1, wherein the starting material mixture comprises an Al compound as a glass-forming component.

* * * * *